Oct. 15, 1963    M. P. DE ROBERTIS    3,107,028
CONTAINER CONSTRUCTION
Filed Aug. 7, 1961
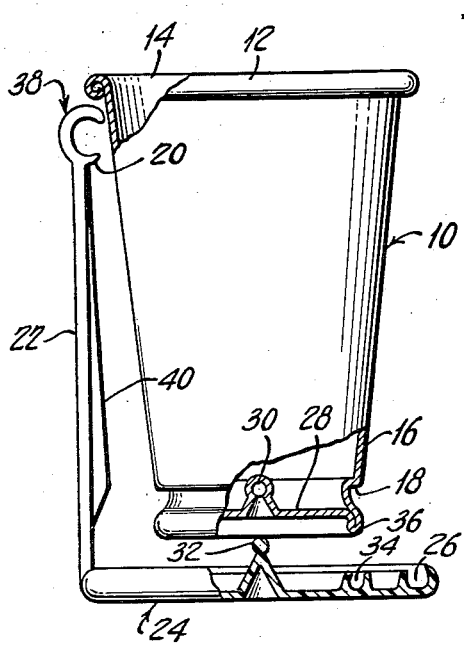
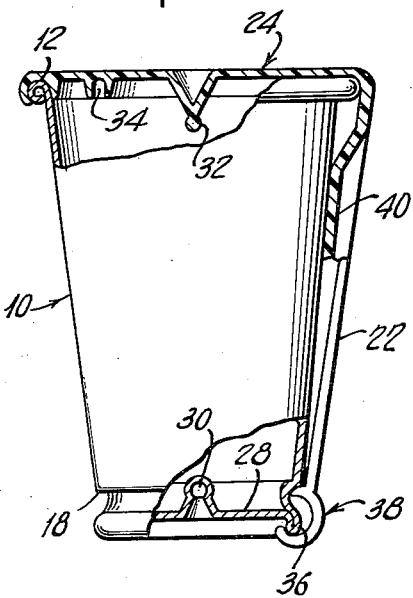
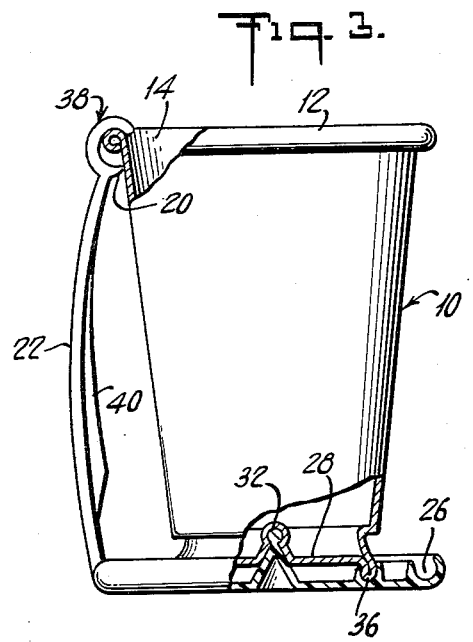
INVENTOR
MAURICE P. DE ROBERTIS
BY McGlew and Toren
ATTORNEYS United States Patent Office 3,107,028
Patented Oct. 15, 1963

3,107,028
CONTAINER CONSTRUCTION
Maurice P. De Robertis, 810 Garden St., Hoboken, N.J.
Filed Aug. 7, 1961, Ser. No. 129,753
7 Claims. (Cl. 220—60)

This invention relates in general to container constructions and in particular to a new and useful cup container having a cover which is adapted, upon removal, to engage the underside of the cup and form a supporting saucer and which also includes a handle member which extends from the cover and is connectable to the upper rim of the cup when the cover is attached to the bottom of the cup.

The present invention is an improvement over prior art container constructions, particularly in the provision of an inexpensive cup for coffee, juices and similar beverages having a removable cover which is advantageously made of an inexpensive material, such as paper, plastic and the like. The cover includes a handle forming member which is adapted to extend down the side of the container and fit into an annular groove at the bottom thereof, and is hooked in position when the cover is arranged to close the cup. When the cover is removed, a projection formed at the center of its inner face is inserted into a socket formed at the bottom of the cup to effect anchoring of the cup at the center of the cover. In this position, the cover forms a saucer for the cup. The flexible handle portion is then hooked over the upper rim of the cup. The handle portion is of a resilient material so that the center bulges outwardly from the cup and forms a handle which may be easily grasped.

Accordingly, it is an object of this invention to provide an improved cup construction.

A further object of the invention is to provide an inexpensive cup including a removable cover which is adapted to be connected to the bottom of the cup to function as a support and saucer therefor.

A further object of the invention is to provide a cup made of an inexpensive material such as paper, plastic and the like having a cover member which is removable and wherein the cover and the bottom of the cup include cooperable ball and socket fastening members to anchor the cover into position beneath the cup to function as a support and saucer therefor.

A further object of the invention is to provide a cup having a removable cover with a flexible handle portion which is adapted to be connected to the rim of the cup when the cover is removed and placed beneath the cup.

A further object of the invention is to provide a cup or container which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is an exploded elevational view partly broken away of a cup and combination cover, support and handle member constructed in accordance with the invention;

FIG. 2 is a side elevation, partly in section, of a container or cup having a cover member arranged to close the top thereof, of the embodiment indicated in FIG. 1;

FIG. 3 is a side elevational view, partly in section, indicating the cup with the cover member positioned in supporting position attached to the bottom of the cup and with the handle attached to the upper rim thereof.

Referring to the drawings in particular, the invention embodied therein includes a cup or container generally designated 10 advantageously made of an inexpensive material such as paper, paperboard, plastic, etc. and which includes a top rim 12 extending around a top opening 14.

In accordance with the invention, a cylindrical side wall 16 is formed with an annular recess 18 adapted to receive a hooked end portion 20 of a handle portion 22 of a cover, support and handle member generally designated 24, when the cover member 24 is in a position closing the open end 14 such as indicated in FIG. 2. In the closed position of the cover member 24, an annular socket portion 26 thereof tightly engages the annular rim 12 of the container 10.

A feature of the invention is that the cover may be removed when the liquid is to be consumed and connected through snap-fastening means to a bottom wall 28 of the cup. In the embodiment illustrated, the snap-fastening means includes a ball-socket recess 30 which is formed at the center of the bottom wall 28 and a ball projection 32 which is formed as an upstanding projection at the center of the interior face of the cover 24. In addition, an annular socket portion 34 is arranged to snap into engagement with a bead or ball portion 36 formed at the outer rim of the bottom wall 28.

When the cover 24 is connected to the bottom wall 28 as indicated in FIG. 3, it functions as a supporting stand and a saucer therefor. The member 24 is advantageously made of a flexible material such as plastic and is bent into a curved outline to permit a socket end thereof designated 38 to engage over the rim 12. The handle advantageously includes side stiffening members 40 which reinforce the handle and permit easier grasping by the hand.

Thus, the invention provides a very inexpensively constructed container which may be filled with a liquid such as coffee and closed to permit transportation thereof without spilling the liquid. In such event, the handle is hooked in an annular groove 18 and around an annular bead 36 formed at the lower end of the container 10. When the liquid is to be consumed, the cover is removed and quickly secured to the underside of the cup by snapping the ball 32 into the socket 30 and the annular bead 36 into the annular socket 34. This completely anchors the bottom of the cup to the saucer and provides a wide supporting stand and a saucer for the cup. In addition, the handle is easily connected to the upper rim 12 of the container 10 by snapping the socket portion 38 over this rim.

While a specific embodiment of the invention has been shown and described in detail to illustrate the application of the inventive principles, it will be understood that the invention may be embodied otherwise without departing from such principles.

What is claimed is:

1. A container having a closed bottom wall and an open top with a rim having a bead defined therearound, a cover member having an annular socket engageable with said rim bead to close said container, said bottom wall being of lesser dimension than said top opening and having a recess defined therein, said cover having a projection formed on one face thereof engageable in said recess to lock the cover in position adjacent said bottom wall to form a supporting stand for said container, and a handle portion formed on said cover having an elongated portion terminating in a socket adapted to engage with said rim bead when said cover is connected to said bottom wall, and to extend between said cover and said rim.

2. A container having an open top with a rim formed therearound, a cover having a portion engageable with said rim to close said container, said container having a bottom wall, and securing means on said cover and said container bottom wall to secure said cover below said bottom wall at a position forming a support for said container including cooperable ball and socket joint means formed on said cover and said bottom wall.

3. A container having an open top with a rim formed therearound, a cover having a portion engageable with said rim to close said container, said container having a bottom wall, a handle connected to said cover and having means at one end engageable with the rim of said container, the outer wall of said container including means for holding said handle against said container when the cover is in a position closing said container, and securing means on said cover and said container bottom wall to secure said cover below said bottom wall in a position forming a support for the container.

4. A container having a closed bottom and an open top with a rim extending therearound, a cover member having a portion engageable with said rim to close said container, said bottom wall being of lesser dimension than said top opening and having a recess defined therein, said cover having a projection formed on one face thereof engageable in said recess to lock the cover in position adjacent said bottom wall to form a supporting stand for said container, and a handle portion formed on said cover adapted to be connected to the rim of said container when said cover is connected to said bottom wall, wherein said container includes a recess formed in an outer wall thereof, said handle being engageable in said recess when said cover is closing said container.

5. A container having a closed bottom and an open top with a rim extending therearound, a cover member having a portion engageable with said rim to close said container, said bottom wall being of lesser dimension than said top opening and having a recess defined therein, said cover having a projection formed on one face thereof engageable in said recess to lock the cover in position adjacent said bottom wall to form a supporting stand for said container, and a handle portion formed on said cover adapted to be connected to the rim of said container when said cover is connected to said bottom wall, including an annular groove formed on the same face of said cover as said projection, said bottom wall including an annular projecting portion which fits in said groove to lock said cover to said bottom wall when the cover is removed from its container-closing position.

6. A cover for a container comprising annular lip means for engaging the top of a container rim to close the container, and a securement portion formed on a face thereof in a central location for engagement with the cooperable securement on a cup member including an upstanding ball projection formed at the center thereof.

7. A cover for a container comprising annular lip means for engaging the top of a container rim to close the container, and a securement portion formed on a face thereof in a central location for engagement with the cooperable securement on a cup member, including a flexible handle portion secured to said cover and having a socket formed at one end for engaging the rim of said container, said handle portion including a hook portion adjacent the socket end for engagement with a side wall of the container when the cover is closing the container.

References Cited in the file of this patent

UNITED STATES PATENTS

| | | |
|---|---|---|
| 179,354 | Schifferle | June 27, 1876 |
| 1,666,389 | Mander | Apr. 17, 1928 |
| 2,805,017 | Hill | Sept. 3, 1957 |
| 2,910,219 | Bennett | Oct. 27, 1959 |

FOREIGN PATENTS

| | | |
|---|---|---|
| 178,280 | Germany | Nov. 12, 1906 |
| 533,124 | Great Britain | Feb. 6, 1941 |
| 1,231,761 | France | Apr. 19, 1960 |